Jan. 9, 1923.
R. F. SMALLWOOD.
ICE CREAM DISPENSER.
FILED OCT. 31, 1919.
1,441,305.
5 SHEETS—SHEET 4.
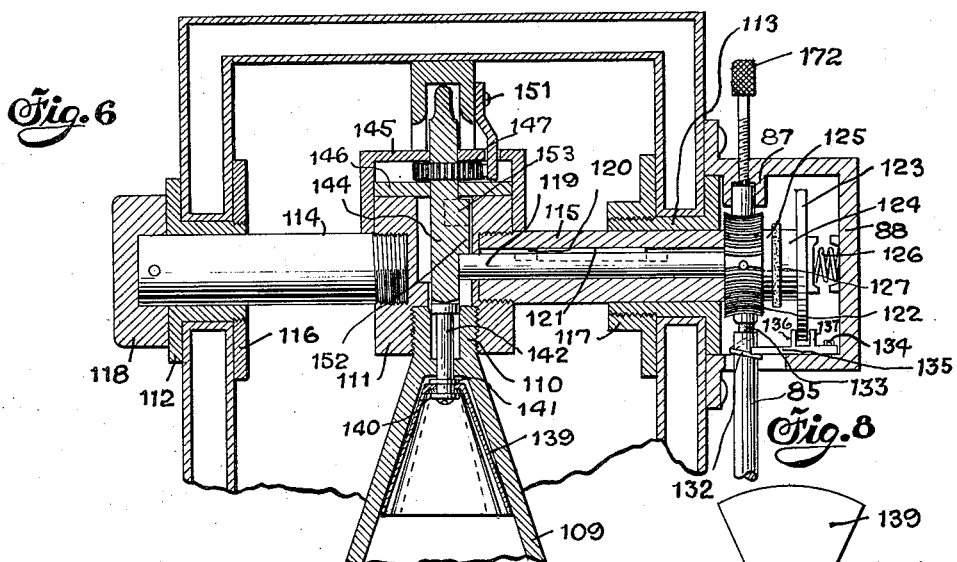
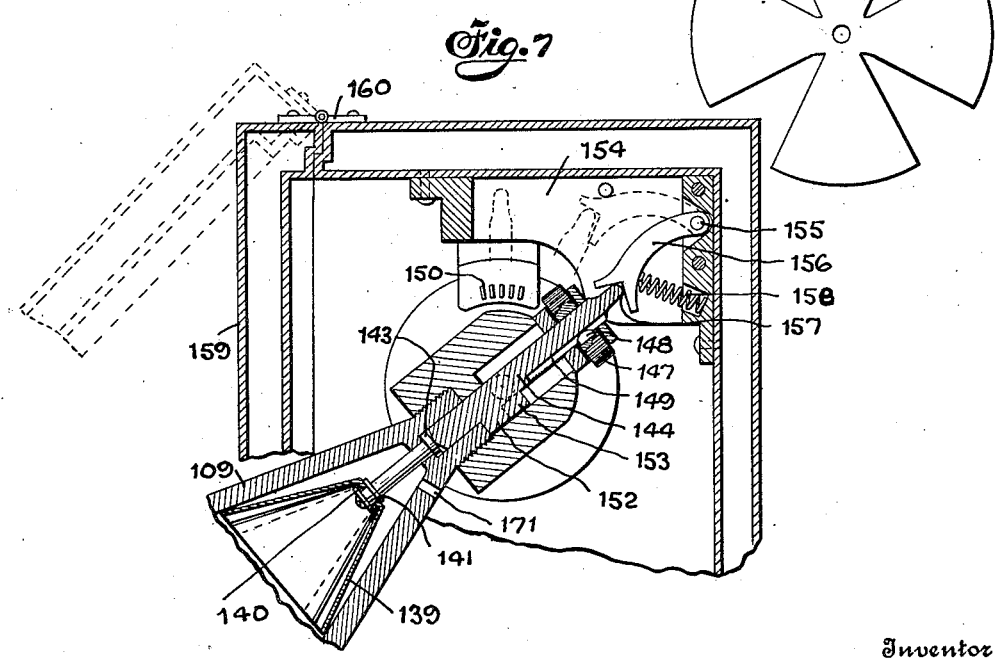
Inventor
Robert F. Smallwood
By Emery, Varney, Blair & Hoguet
Attorneys

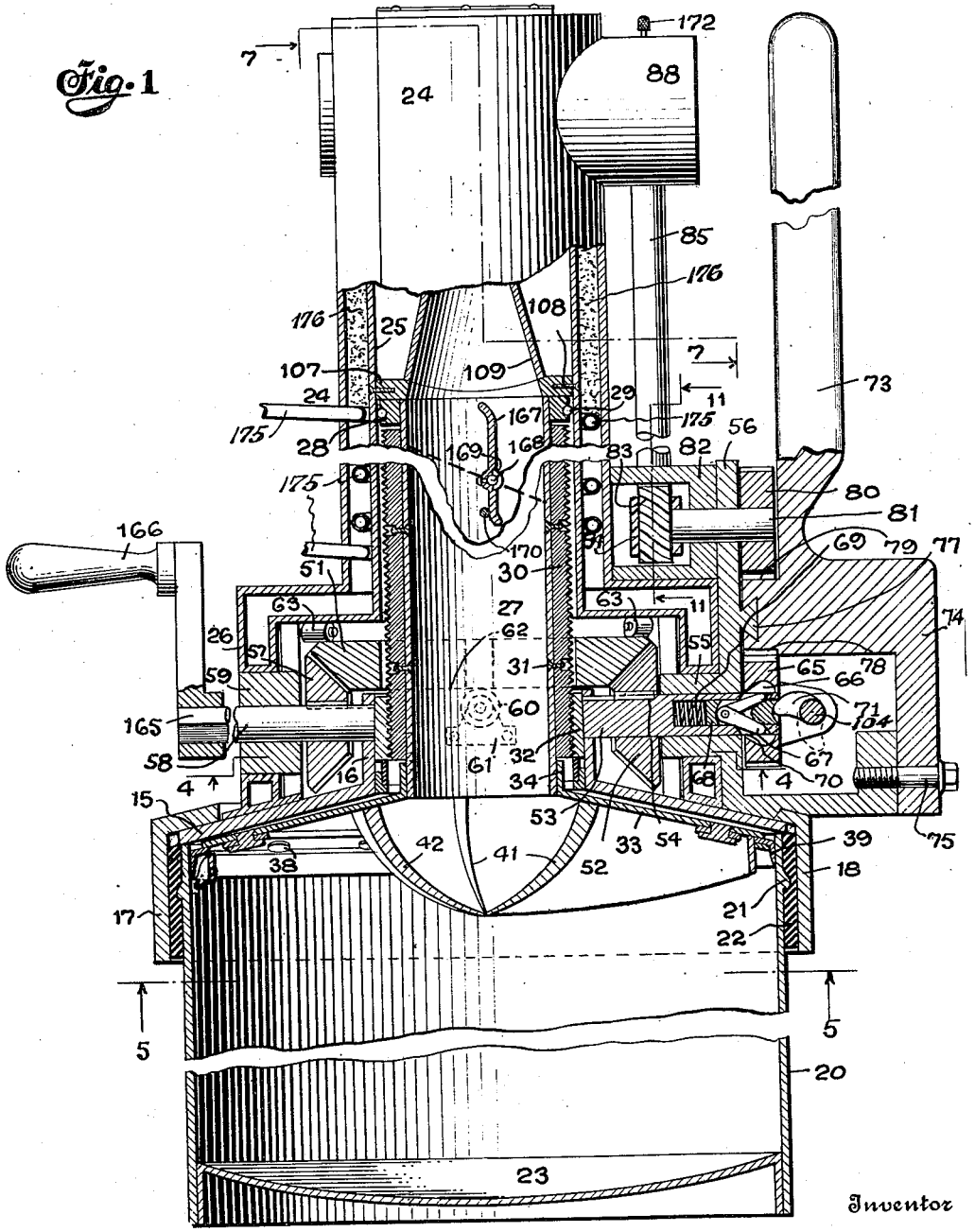

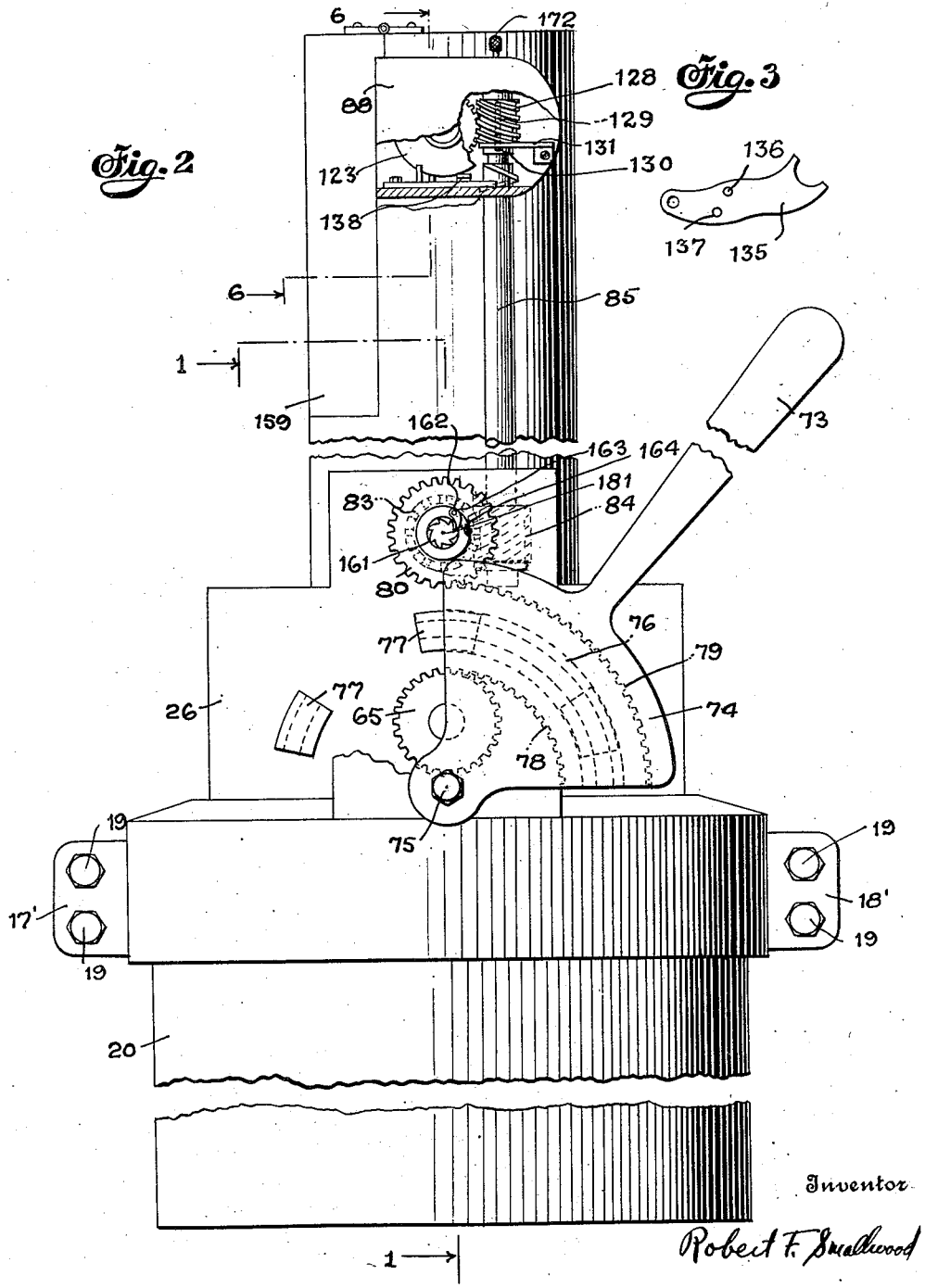

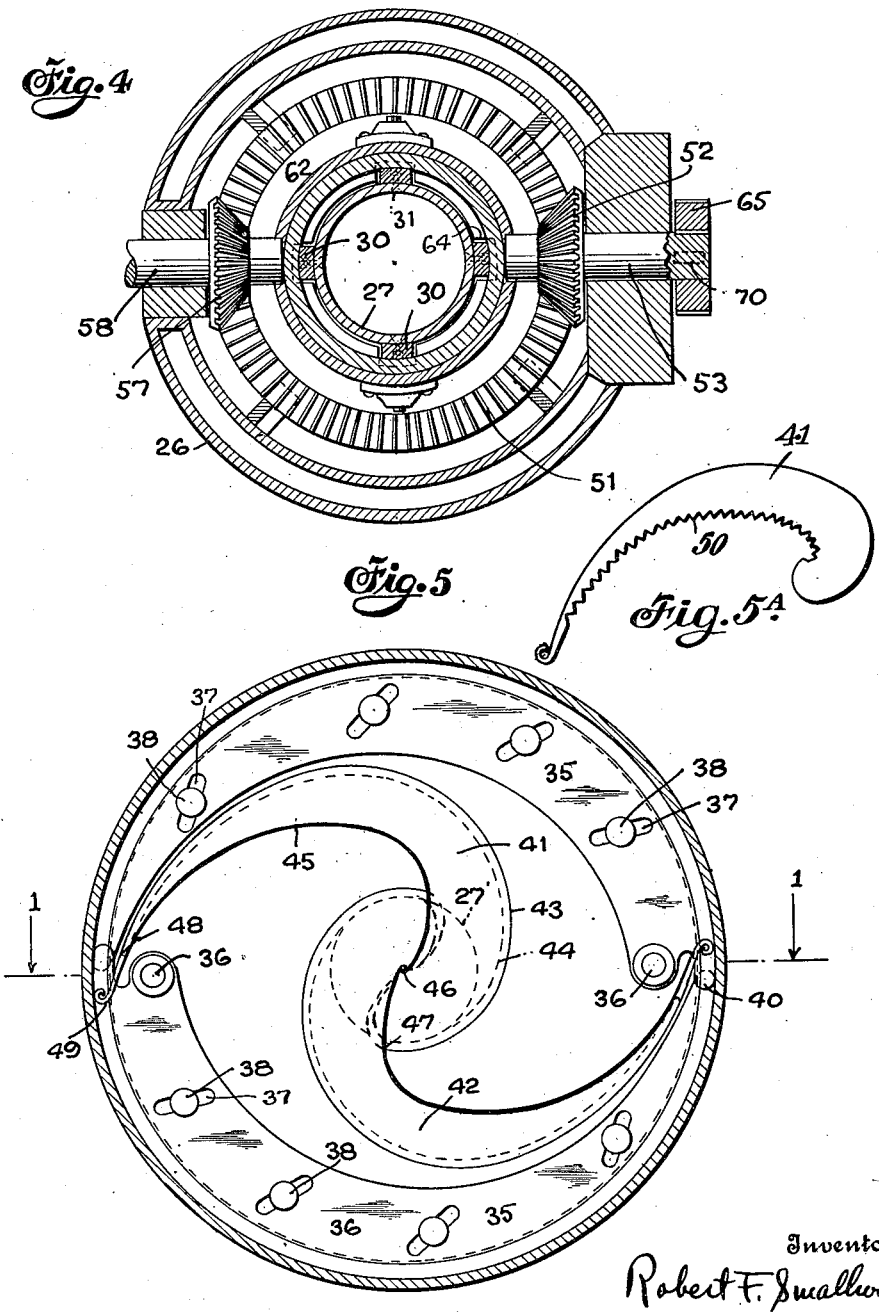

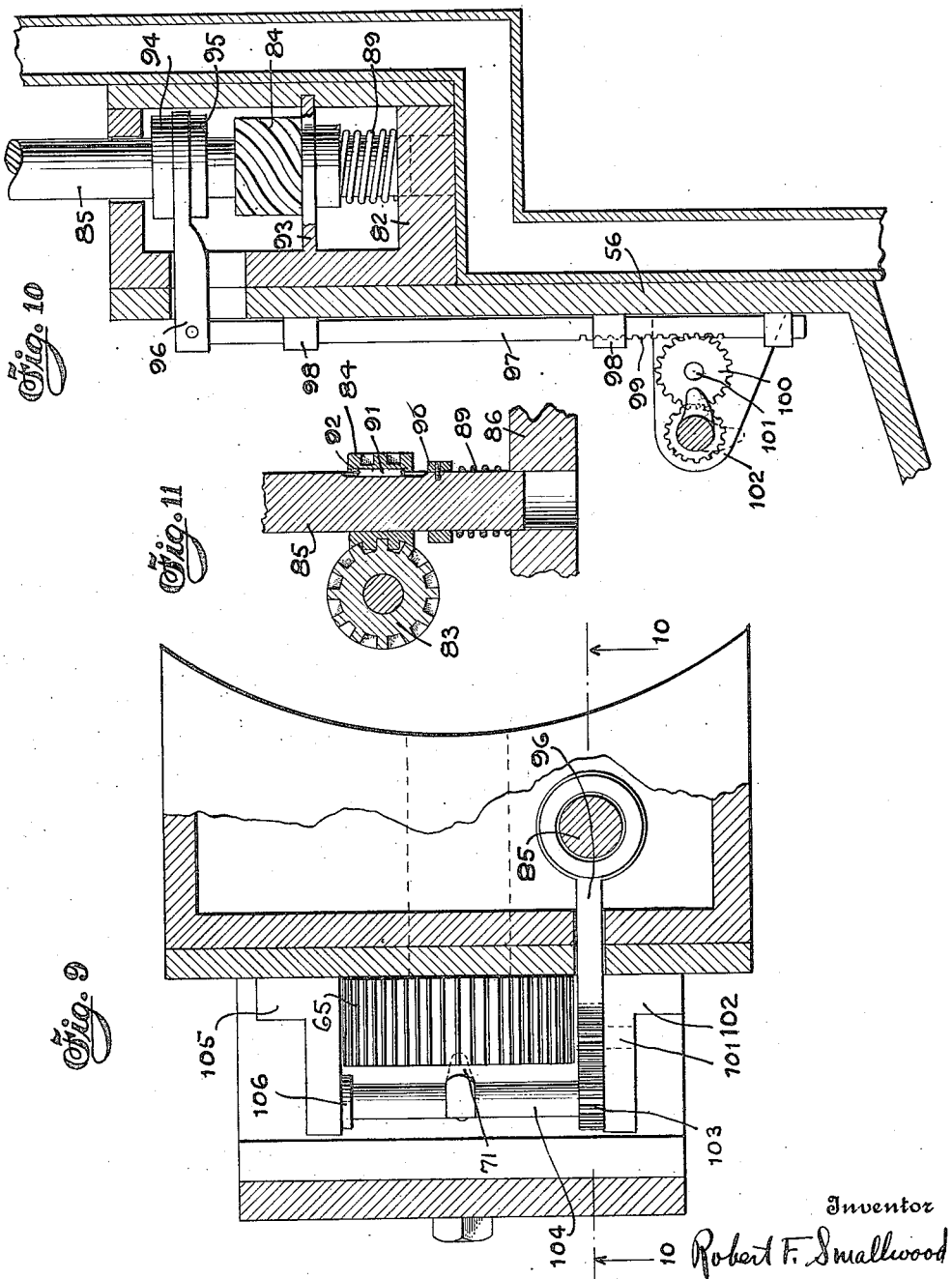

Patented Jan. 9, 1923.

1,441,305

UNITED STATES PATENT OFFICE.

ROBERT F. SMALLWOOD, OF NEW YORK, N. Y.

ICE-CREAM DISPENSER.

Application filed October 31, 1919. Serial No. 334,808.

*To all whom it may concern:*

Be it known that I, ROBERT F. SMALLWOOD, a citizen of the United States, residing in the city of New York, county of New York and State of New York, have invented an Improvement in Ice-Cream Dispensers, of which the following is a specification.

This invention relates to an apparatus for handling plastic or semi-solid substances and materials and more particularly it relates to an apparatus for mechanically handling and dispensing such materials of the general nature of ice cream.

One of the objects of this invention is to provide a practical and reliable apparatus for dispensing ice cream from containers of the usual commerical form and to provide such an apparatus as will perform such dispensing operations mechanically and automatically and in a manner that will be entirely sanitary. This invention aims to avoid the use of hand devices such as ladles, spoons, etc., which use is always accompanied by a tendency toward insanitary conditions which may often be of considerable magnitudes.

In the use of the usual types of hand ladles and forms, there is always the objection that the desired degree of refrigeration of the cream cannot be maintained for the reason that with each individual use of the hand device, air of atmospheric temperature is admitted to the unfilled upper space of the container, so that when the container is again covered the ice packing surrounding the container must withdraw the heat from the air so admitted. Some of the heat of the air so admitted is also withdrawn by the cream in the container itself so that there results a certain degree of softening or melting of the cream. The most serious disadvantage, however, is that there results a great consumption of ice packing to maintain the desired refrigeration and such consumption is accompanied not only by an increased cost of maintenance, but also by considerable labor in replenishing the supply of packing around the container.

One of the prime objects of this invention is to do away with the foregoing disadvantages by mechanically dispensing ice cream from the container in such a manner that the container is never uncovered and that therefore no air of atmospheric temperature, with its attendant bad results, is admitted therein.

Another object of this invention is to provide an apparatus which will mechanically extract ice cream from the container and after molding the latter into any desired form, deliver the molded cream automatically to the dish or other means upon which it is to be served.

A further object of this invention is to provide an apparatus embodying the above mentioned features in such manner that the apparatus will be self-contained and of such structure that it may be readily and easily attached to containers of the standard form or transferred from one container to another with great facility.

This invention also aims to embody the above mentioned features and advantages in an apparatus that will be neat and attractive in appearance, compact in structure and thus requiring but little space so that it may readily and desirably be incorporated in and used in connection with serving counters of the type and form now universally employed.

Other objects will be in part obvious and in part pointed out hereinafter.

The invention accordingly consists in the features of construction, of combinations of elements and arrangement of parts which will be exemplified in the structure hereinafter described and the scope of the application of which will be indicated in the appended claims.

In the accompanying drawings in which is shown one embodiment of this invention as applied in dispensing ice cream, Figure 1 is a longitudinal cross-section along the line 1—1 of Figure 2 and of Figure 5, with certain parts shown in elevation for the sake of simplicity, and Figure 2 is a side elevation of this preferred embodiment of this invention with certain parts omitted as detailed in Figures 9, 10, and 11.

Figure 3 is a plan view in detail of one piece of mechanism, and

Figure 4 is a section on line 4—4 of Figure 1.

Figure 5 is a section on the line 5—5 of Figure 1 with certain parts omitted for clearness, showing certain other parts in elevation.

Figure 5ᵃ is a top plan view of another form of blade.

Figure 6 is a section on a larger scale on the line 6—6 of Figure 2, showing certain details of the molding and ejecting mechanism with certain parts shown in elevation for simplicity and clearness.

Figure 7 is a cross-section on a larger scale on the line 7—7 of Figure 1, showing certain parts in one operating position, and Figure 8 is a development on the same enlarged scale of auxiliary parts used in connection with the molding and ejecting apparatus.

Figure 9 is a plan view partly in section and with certain parts broken away; Figure 10 is a detailed side view partly in section along the line 10—10 of Figure 9, having certain parts broken away and others omitted; and Figure 11 is a section along the line 11—11 of Figure 1. These three figures are on a larger scale and show certain features of the operating mechanism connecting the molding and ejecting mechanism with the main structure. Similar reference characters refer to similar parts throughout the several views of the drawings.

Referring to Figures 1 and 2 in particular, there is shown a main base member 15 having a shape corresponding preferably to a truncated cone of low altitude and having at its upper truncated portion a substantially cylindrical extension forming the collar 16. At its lower or base portions, the base member 15 has positioned so as to overlap it downwardly two semi-circular band members 17 and 18 having at their coinciding ends radial extensions 17′ and 18′. These radial extensions have extending through suitable openings therein the bolts 19 by means of which the two band members 17 and 18 may be securely clamped together after the base member 15 has been mounted upon the cylindrical container 20 which is provided at its upper exterior portion with a bead 21. Extending circumferentially around the container 20 there is a gasket composed of a suitable material such as rubber or leather, for example, and which securely seals the base member 15 to the top of the container 20 when the two band members 17 and 18 are securely clamped together by means of the bolts 19. The gasket 22 is preferably made as a lining to the band members 17 and 18, and in cooperation with the bead 21, insures a rigid and sealed connection between the base 15 and the container 20. The latter is provided with the usual bottom 23.

Mounted upon the base 15 is a chamber of irregular shape and built of an exterior wall 24 and an interior wall 25. This chamber has an enlarged section 26 at its lower portion forming a housing for certain operating mechanism to be described hereinafter. Its upper portions are substantially cylindrical and extend preferably to a height slightly greater than the depth of the container 20 for a purpose to be hereinafter mentioned.

Extending upwardly into the interior of the chamber 24 is a tube 27 provided at its upper end with a ring or collar 28 forming a slidable bearing surface whereby the tube 27 is guided at its upper end within the interior wall or tube 25 of the upwardly extending cylindrical chamber. The collar 28 may be provided in its exterior surface with grooves for receiving a packing material as is indicated at 29 for insuring against leakage between the collar 28 and the tube 25. The tube 27 is provided with vertically extending members 30 mounted preferably at equally spaced distances around its exterior as by the rivets 31, and in the embodiment herein illustrated there are shown four such vertically extending members 30 as in Figure 4. At their exterior surfaces the members 30 are provided with threads and together form a screw which is threaded into the nut 32 rigidly mounted in the interior of the upwardly extending cylindrical portion 16 of the base 15. The thread on the members 30 may be of any desired pitch and may be a double or triple thread.

Secured to the lower extremity of the tube 27 there is a diaphragm 33 having preferably the shape of a truncated cone and having in general the same angular dimensions as base member 15. The diaphragm 33 is secured to the tube 27 by means of the collar 34 at its upper portion and integral therewith, and is preferably welded or sweated to the tube 27 to form a non-leakable connection therewith. The diameter of the diaphragm 33 is preferably made slightly less than the inside diameter of the container 20, and in order to make the connection between the diaphragm 33 and the walls of the container 20 substantially leak-proof, the diaphragm has mounted upon its outer edges, as is clearly shown in Figure 5, two segments 35 pivoted at their one end by means of the pin 36. The segments 35 are provided at convenient distances from the pivot 36 with slots 37 which are in reality arcs of circles formed by having the center of the circle extending to each slot always at the pivot point 36. Extending through the slots and rigidly secured to the diaphragm 33 are the pins 38 whose heads act to hold the segments 35 to the diaphragm 33 and whose cylindrical bodies form guides for maintaining the segment 35 in proper operating position. It will be noted that the segments 35, therefore, have a slight freedom of motion and further, that at their exterior circumferential portions, are provided with an upturned (as viewed in Figure 5) portion 39 extending in a general axial direction. The edges of the upturned portion 39 are preferably made sharp and the material of which the segments 35 are made is preferably of a highly resilient character for a purpose to be hereinafter more clearly described.

It is to be noted that the segments 35 overlap each other as at 40 and thus provide a sealed connection between the diaphragm 33 and the container 20 which extends around the entire circumference.

On the interior surface of the cone shaped diaphragm 33 there is mounted a plurality of blades, and in the embodiment herein disclosed there are shown two blades 41 and 42 shown in plan in Figure 5 and partially in section in Figure 1. The blade 41 is provided with a base portion at which it has the form of curvature shown by line 43 which line, it will be noted, starts at a point which is substantially on the circumference of the diaphragm 33 and which ends substantially tangentially to the opening of the tube 27 indicated in the dotted line 27' in Figure 5. The line 43 represents the intersection of the exterior surface of the blade with the surface of the diaphragm 33, whereas the dotted line 44 represents the intersection of the interior surface of the blade 41 with the surface of the diaphragm 33 and is tangent to the opening 27'. The edge remote from the base portion of the blade 41 takes the general curvature shown by line 45, which edge 45, it will be noted, begins at a substantially circumferential point in the diaphragm 33 and terminates at substantially the center 46 of the opening 27'. The blade 41 is welded or otherwise securely fastened to the diaphragm 33 in a surface of contact which extends substantially from the point 47 to the point 48 thus leaving the end portion 49 free from the diaphragm in order that it may extend over and clear the segment 35. The end portion 49 of the blade 41 is curled over at its extreme end for a purpose to be hereinafter described and by reason of the resiliency of the material of which the blade itself is made, it tends to spring in an outward direction so that the extreme end or curled portion is always in contact with the interior wall of the container 20. The edge 45 of the blade is preferably made sharp and in a modified form may be serrated as indicated in the dotted lines at 50.

The blade 42 is identical to the blade 41 and the two are mounted upon the diaphragm 33 symmetrically with respect to the axis 1—1 of Figure 5. As will be seen from Figure 1, the blades are tapered in a direction from the center to the circumference terminating at the circumference in the end portions 49 which coincide substantially with the cylindrical surface of the interior of the container 20. The two blades 41 and 42, when so mounted upon the diaphragm, have their edges 45 meeting substantially in a point 46, and by virtue of their shape substantially interlock.

Referring more particularly to Figure 1, it will be noted that the curled end portions 49 of the blades extend below the downturned portions 39 of the diaphragm 33 so that they may contact at all times with the inside wall of the container 20 without interfering with the downturned and sharpened portions 39 of the diaphragms. The purpose of this construction will be hereinafter more clearly described. In Figure 1 the diaphragm 33 with its associated members is shown in section, this section being taken on the line 1—1 of Figure 5. It will be accordingly noted that the blades 41 and 42 have in addition to the curvatures already described the cross sectional curvatures as shown in Figure 1 wherein the cross sectional tapering to a sharpened edge of these blades is clearly shown. The action of the blades will be described in detail in connection with the operation of the apparatus.

Reference to Figures 1 and 4 shows a bevel gear 51 mounted about the tube 27 and its associated threaded members 30. The bevel gear 51 is contained within the housing 26 and is supported by the bevel gear 52 mounted upon the shaft 53 and keyed thereto by the key 54, this shaft 53 being mounted in the bearing 55 formed preferably integrally with the side member 56; and diametrically opposite the gear 53 the bevel gear 51 is supported by another bevel gear 57 mounted upon and keyed to the shaft 58 bearing in the bushing 59 suitably secured to the housing 26. The gear 51 is furthermore supported in the plane perpendicular to the vertical plane through the bevel gears 52 and 57 by means of rollers 60 mounted within the brackets 61 secured to the exterior of the cylindrical portion 16 of the base member 15 and contacting with the surface 62 of the gear 51. This latter construction is shown in dotted lines in Figure 1 and in plan in Figure 4 and it will thus be seen that the gear 51 is supported at four points preferably equally disposed around its circumference. The upward thrust upon the gear 51 is taken up by means of rollers 63 diagrammatically illustrated in Figure 1 and contacting with the upper face of the gear and with the upper interior surface of the housing 26.

The gear 51 is bored out to a diameter slightly greater than the outside diameter of the tube 27 and is undercut as at 64 in order to accommodate the vertically extending threaded members 30 attached to the exterior of the tube 27. This construction is provided in order that rotation of the gear 51 will cause a rotation of the tube 27, the rotary thrust of the gear 51 being transmitted to the latter by means of the threaded members 30 and it is to be noted that such rotation will take place regardless of the vertical position of the tube 27 within the tube 25.

Mounted upon the right hand end of the shaft 53 is a spur gear 65 provided at its interior with ratchet portions 66 adapted to engage the dogs 67 which are pivoted to the cylindrical member 68 suitably under-cut to provide for the mounting of the dogs 67 thereon and slidably mounted within the counter-bored end of the shaft 53. The member 68 is forced in an outward direction by means of a spring 69 and each of the dogs 67 protrudes through a slot 70 in the cylindrical end portion of the shaft 53 so that upon the action of the spring 69 the dogs 67 are forced to protrude or extend beyond the exterior cylindrical surface of the shaft 53 and thus to engage the ratchet portions 66 of the spur gear 65. The slots 70 are diametrically opposite and in Figure 4 is shown in elevation one of the slots 70 with a dog 67 resting therein. In Figure 1 the dogs 67 are shown in their inoperative position in which they are retracted and do not engage the interior ratchet members 66 of the spur 65. The exterior end of the member 68 is adapted to engage a cam 71 mounted upon the shaft 104 which cam is adapted to force the member 68 against the spring 69 thereby to withdraw the dogs 67 into the inoperative position shown in Figure 1. This action will be more clearly described hereinafter.

Mounted upon a lateral extension of the member 56 is an operating handle 73 formed at its lower extremity in the shape of a sector 74 at the center of which it is attached and pivoted to the extension of the side member 56 by means of a screw 75. The sector 74 has formed on its interior surface a groove of irregular cross section to form the ways 76 to engage with projections 77 of corresponding cross section and formed on the exterior surface of the side member 56. Thus the sector 74 is at all times guided and retained in proper operative relation during its movements about the pivot 75. The sector 74 is furthermore provided at its interior surface with teeth 78, thus forming substantially a section of an annular gear, to cooperate and engage with the teeth of the spur 65 so that operation of the sector 74 about its pivoted point will cause the operation of the gear 65. Similarly, there are provided also teeth 79 forming substantially a rack for engagement with the spur 80 mounted (in a manner to be later described) upon the shaft 81 mounted within bearings formed in the side member 56 and the housing 82. Similarly, operation of the sector 74 about its pivot 75 will cause the operation of the spur 80 with which the rack 79 is in engagement.

Upon the opposite end of the shaft 81 is mounted a spiral gear 83 cooperating with a spiral gear 84, preferably of like diameter.
The spiral gear 84 is mounted upon the shaft 85 which rests at its one end in the bearing 86 formed in the housing 82 and at its other end in the bearing 87 formed preferably integrally with the housing 88 attached to the upper exterior portion of the chamber 24. This construction is more clearly shown in Figures 6, 10, and 11 wherein it will be further noted that the shaft 85 is adapted to move downwardly within its bearings, being normally held in the upward position shown by means of the spiral spring 89, tending to give the shaft 85 an upward thrust by means of the collar 90 and reacting against the upper interior surface of the housing 82. In order to provide for such movement of the shaft 85 along its axis without interfering with the operation of the spiral gears 83 and 84, the latter is loosely mounted thereon and is provided with a key-way 91 cooperating with the key 92 secured to the shaft 85. Thus the shaft 85 may move downwardly and be rotated by the gear 84 simultaneously, the latter bearing against the bracket 93 extending across the housing 82, as shown in Figure 10. The shaft 85 may also be moved downwardly by manually rotating the thumbscrew 172 threaded in the bearing 87 and contacting with the upper end of shaft 85.

Referring to Figure 10 the shaft 85 is provided with two collars 94 and 95 rigidly secured thereto as by pins for example and has mounted upon it and between the collars 94 and 95 the arm 96 in such manner that the shaft 85 may freely rotate within the right hand end of the arm 96 and so that any motion of the shaft 85 along its axis will cause a like movement of the arm 96 in an upward or downward direction. At its left hand end the arm 96 has preferably pivotally secured thereto the rod 97 of substantially square cross section and slidably mounted in the guides 98 secured to the side member 56. At its lower end the rod 97 is provided with teeth thus forming the rack 99 engaging the spur gear 100 mounted upon the pin 101 secured to the bearing member 102 attached to the side member 56. The spur 100 in turn engages the spur gear 103 keyed to the shaft 104 rotatably mounted in the bearing members 102 and 105 attached to the side member 56. The shaft 104 is held in proper operating position between the bearing members 102 and 105 by means of the spur 103 at one end contacting with the bearing member 102 and at the other end by means of the collar 106 preferably rigidly pinned to the shaft 104 thereby to prevent any objectionable end play of the shaft within its bearings. The shaft 104 has mounted at substantially its center the cam 71 which may also be pinned thereto and which may be brought into operative relation to the slidable member 68 (see Figure 1) to operate the dogs 67 mounted thereon.

Referring to Figure 1 there is shown mounted in the upper end of the interior tube 25 a collar 107 which fits tightly within the tube and which may be secured thereto as by screws 108. The interior of the collar is shaped to form the extension of the interior of the cone or mold 109 and its maximum inside diameter is equal to the interior diameter of the tube 27. The upper surface of the collar 107 is so shaped that the cone 109 may be swung in an outward direction and its upper surface therefore is substantially that of a section of a sphere. Likewise the end surface of the mold 109 is so shaped that it forms a spherical section which may coincide at any point in its outward movement with the upper surface of the collar 107. This construction is made more clear by reference to Figures 6 and 7 wherein the mold or cone 109 is shown pivotally mounted, the spherical surfaces hereinbefore mentioned having for their center a point in the axis of rotation of the mold 109.

The mold 109 is herein shown cone-shaped but may have any shape desired to give to the ice cream for serving and is formed at its upper end into an extension 110 which is threaded and received by a central mounting member 111 which is pivotally mounted in the bearings 112 and 113 by means of the sleeves 114 and 115 respectively which are threaded into its corresponding sides. The bearings 112 and 113 are mounted in the upper end of the double-walled chamber and are held in place respectively by the collars 116 and 117 threaded upon their interior ends. The sleeve 114 and the bearing 112 is provided with a cap 118 which is suitably secured to the bearing member 112 and which may be integral therewith.

The sleeve 115 is hollow and carries within it the shaft 119 which is made to rotate with the sleeve 115 by means of the key-way 120 extending throughout the length of the sleeve 115 and by means of the key 121 suitably mounted in a key-way in the shaft 119. At its exterior end the shaft 119 has rigidly mounted upon it a disc member 123 provided with the hub 124. Intermediate of the exterior end of the sleeve 115 and of the hub 124 there is rotatably mounted upon the shaft 119 the worm wheel 122, which is provided at its exterior end with a hub 125 having a smooth end and plane surface to cooperate with the plane end surface of the hub 124 of the disc member 123. Between the exterior end of the hub 124 and the interior face of the housing 88 is suitably mounted a spiral spring 126 which normally tends to force the hub 124 towards the hub 125 so that the contacting end surfaces thereof will be brought into frictional contact so that a rotation of the worm wheel 122 will cause a rotation of the hub 124 and its associated shaft 119 and sleeve 115. The hubs 124 and 125 thus form a clutch and may have interposed between their end surface a suitable frictional member 127 which may be composed of a material such as cork or leather for example, to increase the frictional and driving contact. In the position shown in Figure 6 these parts are illustrated as being in driving contact. The worm wheel 122 is driven by means of a worm 128 mounted in slidable relation upon the shaft 85. This construction is shown in Figure 2 and it will be noted that the worm 128 is provided with a key 129 engaging the key-way 130 on the shaft 85 so that the latter may move along its axis without carrying the worm with it. The latter is prevented from axial movement by means of the end bearing 87 and the bracket 131 attached to the interior of the housing 88.

Immediately underneath the worm 128 the shaft 85 is provided with a snail elevating cam 132 which terminates at its upper end into the under-cut portion 133 of the shaft 85. Pivotally mounted by means of the screw 134 on the interior base of the housing 88 and adapted to cooperate with the snail cam 132 is the interlocking member 135 provided with the pins 136 and 137 so spaced that the disc 123 may operate therebetween. The interlocking member 135 is shown in Figures 2 and 6 in operative relation and in Figure 3 is shown a detail plan thereof. Its one end is provided with a recess which is preferably semi-circular and having a radius equal to half the diameter of the shaft 85. Referring to Figure 6 it will be noted that the interlocking member 135 may be swung about its pivot 134 by means of the disc 123 engaging either of the pins 136 or 137 and that when engaging the former its recessed end is brought into engagement with the shaft 85 and with the snail cam 132 so that as the shaft rotates the shaft is thrust in a downward direction until the under-cut or grooved portion 133 thereon is brought opposite the recessed end of the interlocking member 135 whereupon a rotation of the shaft 85 may continue in its newly attained lower-most position. The upward thrust on the interlocking member 135 is taken up by the brace 138 secured to the interior base of the housing 88 and extending over the interlocking member 135. Engagement of the disk 123 with the pin 137 disengages the interlocking member 135 from the groove 133 in the shaft 85 and allows the latter by virtue of the action of the spring 89 to return to its normal upper position.

Mounted in the upper end of the mold 109 is an expandible gauging and expelling member 139 rigidly mounted between the collars 140 and 141 on the plunger 142 extending through an axial opening in the upper end of the mold 109. The gauging member 139 is composed of a highly resilient material and in development has the general shape shown in Figure 8 so that when mounted upon the plunger 142 it may conform to the general shape of the interior of the mold 109 and will always form a complete mold or cone-shaped member in itself by reason of the overlapping of its four sector-shaped parts. This overlapping together with the resilient nature of the metal gives the member 139 its desired expansible characteristic.

At its upper end the plunger 142 is provided with a head 143 which is in slidable engagement with the interior cylindrical surface of the upper end of the mold 109. The plunger 142 is adapted to cooperate with a combined shaft and cam member 144 which is mounted at its upper end in the bearing formed in the housing 145 and in the bearing 146. Between the housing 145 and the bearing 146 the cam member 144 has mounted upon it a spur gear 147 provided with a key 148 adapted to cooperate with the extended key-way 149 in the shaft or cam member 144 in order that the latter may be rotated and simultaneously move along its axis. The spur 147 cooperates with a rack 150 as shown in Figure 7 which is of the form of an arc of a circle whose center is at the axis of the sleeves 114 and 115. The rack 150 is suitably secured to the housing 145 as by the screws 151.

The shaft member 144 is substantially circular in cross section excepting at its central portion where it is provided with an enlarged section 152 which is substantially elliptical in cross section and having its minor axis equivalent to the diameter of the shaft member 144 and its major axis of a length equivalent to the section shown at 152 in Figures 6 and 7. At the upper end of this enlarged section 152 there is provided a cam surface 153 shown in dotted lines in Figures 6 and 7 which surface merges from the cylindrical surface of the shaft member 144 into the exterior and protruding surface of the enlarged section 152. The purpose of this cam surface will be more clearly hereinafter described.

Mounted in the rear upper interior corner of the chamber 25 is a combined guide and mounting member 154 suitably secured to the upper end and to the walls of the tube or chamber 25. This member 154 is provided with a recess adapted to engage and guide the upper end of the shaft member 144 and has mounted pivotally on the pin 155 a trigger 156 provided at its lower end with a recess 157 adapted to cooperate with and engage the beveled or pointed upper end of the shaft member 144 when the latter is rotated about the axis of the shaft 119. The trigger 156 is retained in the upper position shown in dotted lines in Figure 7 by means of the spiral spring 158 which tends to hold it in such position which is its normal and inoperative position. The cooperation of the trigger 156 with the shaft member 144 will be described in detail hereinafter.

In Figures 1, 2, and 7 is shown a door 159 hinged to the top of the exterior chamber by means of the hinge 160 so that the swinging of the cone or mold 109 about the axis of the shaft 119 will carry in its outward motion the door 159 to assume the position shown in dotted lines in Figure 7. The door 159 is double-walled and is essentially a section of the double-walled chamber itself.

Referring to Figure 1 and more particularly to Figure 2 it will be noted that the shaft 81 at its exterior end is provided with ratchet teeth 161 which are adapted to cooperate with the pawl 162 mounted on the face of the undercut section of the gear 80 by means of the pin 163 and urged in a direction toward the center by means of the spring 164. This construction is for the purpose of causing the rotation of the shaft 81 and its associated parts in a single direction only, such operation being caused by the operation of the handle 73 in the operating direction which is preferably in a direction from right to left as viewed in Figure 2. The ratchet and dog construction incorporated in gear 65 and its associated shaft 53, which construction has already been described, likewise brings about the operation of the shaft 53 and its associated parts in a direction corresponding only to the operating movement of the handle 73 in the desired direction as heretofore described.

The exterior end of the shaft 58 as seen in Figure 1 is provided with a square shank 165 adapted to receive the crank and operating handle 166. The latter is detachable and is normally not used and is provided for the special purpose of returning the operating mechanisms to their normal uppermost position to begin operation upon a newly filled container 20. This will be more clearly described hereinafter.

Mounted in the upper end of the tube 27 (referring to Figure 1) there is a butter fly valve 167 mounted rigidly on the rod 168 which latter is pivotally mounted in bearings 169 in two diametrically opposite points of the tube 27. It will be noted that the axis 168 of the valve 167 is eccentrically mounted slightly to the right of the exact center of the tube 27. The upper half of the valve 167 is curved in the manner shown in Figure 1 and is of greater area than the part extending below the axis 168. A rod 170 extends across the tube 27 to operate as a stop against which the lower portion of the valve may rest in order to retain the valve in its inoperative position as shown.

The purpose of the double-walled upwardly extending chamber formed substantially of two concentric tubes is to provide an air-tight space which may be evacuated and which may be lined with the proper surface to give a non-heat-conducting action familiarly known in the form of the thermos bottle. The purpose therefore is to insulate the interior of the interior tube 25 from the exterior atmospheric temperatures and the preferred embodiment of this invention makes use of the "thermos" principle. It is to be understood, however, that this invention also contemplates other means of preventing heat from reaching the interior of the tube 25 and for this purpose there may be provided in the space intervening the tubes 24 and 25 coils 175 adapted to carry brine of a low temperature or such space may be filled with a heat insulating medium such as cork, wool, etc., for example, diagrammatically shown at 176.

The operation of this apparatus is substantially as follows. The container 20 having been previously filled with ice cream has now mounted upon it the apparatus of this invention securely clamped thereto in a manner heretofore described by means of the clamping members 17 and 18 securely joined by the bolts 19 thus securely sealing the apparatus to the top of the container 20. The tube 27 and its associated diaphragm 33 and blades 41 and 42 are in their upper-most position as shown in Figure 1. The operating handle and crank 166 is detached during the initial stage of operation and is used only at a later stage to be described hereinafter. The butter fly valve 167 has the position shown and the mold 109 likewise assumes and retains the position illustrated in Figure 1. The cam 71, however, is in its inoperative position as shown in dotted lines in this figure and the dogs 67 protrude through the openings in the shaft 53 to engage the ratchet surfaces 66 on the interior of the gear 65. Referring to Figure 6 the gauge member 139 is in its lower-most position and expanded as more clearly shown in Figure 7 and the shaft member 144 is likewise in its lower-most position thereby bringing the end of the shaft 119 in contact with the enlarged portion 152 on the shaft 144. The shaft 119 being in such position slightly to the right of the position shown in Figure 6 likewise carries with it to a corresponding position slightly to the right its cooperating disc member 123 which contacts with the pin 137 on the interlocking member 135 which latter is thereby disengaged from the snail cam 132 on the shaft 85. The trigger 156 assumes the position shown in Figure 7 in dotted lines and the spur gear 147 on the shaft 144 is in engagement with the rack 150 as shown in Figure 6. The shaft 85 is in its upper-most position as shown in Figures 2, 6, and 10 in which latter figure the cam 71 is shown in a horizontal position, the screw 172 being also in its uppermost position, as is clearly shown in Fig. 6. The positions described are the normal positions of the various parts.

The handle 73 is now moved in a direction from right to left as viewed in Figure 2 by any suitable motive power and upon the completion of its motion in one direction, its motion is reversed whereupon it is again in position to assume a travel in an operating direction. Such motion of the handle 73 causes a partial rotation of the sector 74 about its axis 75 thus causing the rotation of the gears 65 and 80. These gears being provided with a ratchet arrangement cause their associated parts to be operated only upon the operative movement of the handle 73 from right to left as viewed in Figure 2 or in an outward direction as viewed in Figure 1. Rotation of the shaft 81 by the gear 80 causes a rotation of the shaft 85 and its associated worm 128 and worm wheel 122, but the latter being free to rotate about the shaft 119 and the clutch members 124 and 125 not being in engagement no operation of the mechanism in the upper part of the chamber takes place.

With each forward motion of the operating handle 73 however, the gear 65 causes the rotation of the shaft 53 and by virtue of the bevel gear 52 rotates the driving gear 51 which in turn by reason of its interior construction and the vertically extending threaded members 30 on the exterior of the tube 27 causes the rotation of the tube 27 with its associated parts. Such rotation has substantially two results. The blades 41 and 42 in their rotation are caused to operate upon the cream in the container 20 and by reason of their form as hereinbefore in detail described cause a centripetal action to take place whereby the cream is forced from the circumferential portions of the container 20 and from the upper part of the mass of cream therein in a direction towards the center of the diaphragm 33 and towards the lower opening of the tube 27. During such action the curled ends 49 of the blades operating in advance of the downwardly extending scraping portions 39 of the segments 35 scrape the cream from the walls of the container 20 and clear the path for the scraping portions 39 of the segments 35 mounted upon the diaphragm 33. Accompanying such rotation of the tube 27 and its associated diaphragm and blade there is a downward movement of the latter parts by reason of the threaded members 30 operating within the nut 32 to carry these parts downwardly. Thus the diaphragm and blades are advanced into the container 20 at a rate which is proportional to the speed at which the cream is forced into the opening of the tube 27 by the blades 41 and 42 and which may be governed by properly proportioning the pitch of the thread on the members 30 and the nut 32 with respect to the rate of rotation of the rotating parts. As the diaphragm 33 is advanced the scraping portions 39, having their path cleared in advance by the curled portions 49 of the blades, always maintain a tight connection which prevents leakage of the cream past and around the diaphragm 33. The curled portions 49 by reason of the resiliency of the ends of the blades are always in contact with the wall of the container 20 to produce such an advance scraping effect and should they encounter any seams within the container such seams are ridden over by the curled portions 49 and therefore do not cause an obstruction to the proper operation of the apparatus. Returning to the action of the blades 41 and 42 their centripetal action causes a concentration of cream at the center of the diaphragm and may be considered also to create a substantial pressure within such center. The opening of the tube 27 being at the center of the diaphragm and the blades being so shaped as shown in Figure 5, this concentration of cream and pressure in this region causes the cream to take the path of least resistance which is in an upward direction up the tube 27. The volume of the cream in the container 20 being diminished by reason of this upward movement of the cream within the tube 27 is compensated for by the downward movement of the diaphragm 33 and its associated parts. The diaphragm in its downward movement may contribute towards forcing the cream into the tube 27 though the major part of this operation is performed by the centripetal action of the blades 41 and 42 in concentrating the material at the mouth of the tube 27 and in creating a pressure within the material at the region of the opening of the tube 27.

Should the cream be of a light consistency or relatively soft the action of the blades will be as hereinbefore described. Should, however, the cream be relatively hard and considerably frozen, the cutting edges 45 of the blades 41 and 42 will shave the cream off the top of the mass in small portions whereupon the action will continue as hereinbefore described. In the modification shown in Figure 5ᵃ herein the cutting edge 45 of blade 41 is shown serrated as at 50, the cutting or scraping action of the blades will be assisted to a material extent by this serrated modified form.

As the cream moves upwardly in the tube 27 it passes the butter-fly valve 167 which remains in its inoperative position as shown in Figure 1. Continuing its upward movement the cream 27 enters the mold 109 being guided by the tube 25 as the tube 27 moves downwardly which as hereinbefore described may be of any desired shape in which it is desired to serve the cream and (referring to Figures 6 and 7) will continue upwardly within the mold 109 to engage the gauging member 139 which is in its lower-most position. Continued upward movement of the cream thereupon carries the gauging member 139 upwardly with it to assume the position shown in Figure 6 whereupon the shaft 119, previously held to the right by means of the extended section 152 of the shaft member 144, is allowed to move to the left to assume the position shown in Figure 6, the extended portion 152 of the shaft member 144 having been moved upwardly by the upward movement of the gauging member 139. Such upward movement of the member 144 allows the shaft 119 to move to the left by virtue of the spring 126 to contact with the section of normal diameter of the member 144.

Movement to the left of the shaft 119 causes a like movement of the disc 123 and also of its associated clutch member 124. The movement of the disc 123 causes the engagement thereof with the pin 136 thereby to carry to the left the recessed end portion of the interlocking member 135 to engage with the shaft 85 and the snail cam 132 thereon. The shaft 85 continuing its rotation due to the motion of the handle 73 in an operating direction thereupon is carried in a downward direction by reason of the engagement of the interlocking member 135 with the cam 132 and carries with it the rack 99 (see Figure 10) to operate the cam 71 by means of the intermediate gears 100 and 103 to engage the slidable member 68 which is thereby forced to the left against the spring 69 thereby to withdraw the dogs 67 from engagement with the ratchet surfaces 66 on the gear 65. Thus the operation of the driving gear 51 and its associated tube 27 and blades 41 and 42 is at once halted thereby to discontinue the further upward movement of the cream within the tube 27 and the tube 25. The cam 71 is held in such engaging position by the retention of the shaft 85 in its lower-most position, this being accomplished by the engagement of the interlocking member 135 with the under-cut portion or groove 133 in the shaft 85 in which the snail cam 132 terminates.

The movement to the left of the shaft 119 causes, as already hereinbefore mentioned, the engagement of the clutch portion of the hub member 124 with the clutch portion of the worm wheel 122 whereupon the shaft 119 is caused to rotate with the worm wheel 122 and to carry with it in its rotation the sleeve 115 with which it is interlocked by means of the key 121 and the key-way 120. Thereupon the mounting member 111 and the mold 109 mounted therein is rotated in an outward direction as viewed in Figure 6 to assume the position shown in Figure 7. Upon such rotation taking place the upper end of the shaft member 144 comes into engagement with the recess 157 of the trigger 156 thereby forming with it what is substantially a toggle joint which when substantially straightened out causes the outward movement of the gauging or expelling member 139 as shown in Figure 7 thereby to expel the cream previously forced upwardly and into the mold 109. The outward swinging of the mold 109 carries with it the door 159 to assume the position shown in dotted lines in Figure 7 whereupon the cream is ejected into a dish or other suitable receiver suitably held in position to receive the ejected molded cream.

In order to allow the shaft member 144 to be moved in a downward direction to cause the ejection of the molded cream from the mold 109 the member 144 is rotated by the engagement of the spur 147 with the rack 150 thereby to move in an outward direction (as viewed in Figure 6) the extended portion 152 of the shaft member 144 in order to remove the extended portion out of the way of the shaft 119.

The ejection of the cream from the mold 109 having taken place the mold is manually forced inwardly to assume its normal vertical position as shown in Figure 1 whereupon the shaft 119, up to this time in engagement with the smaller section of the member 144, is forced to the right by means of the cam surface 153 which has been brought into proper operative relation with respect to the shaft 119 by the initial downward movement of the member 144 and its associated parts. The shaft 119 rides up on the cam surface 153 which surface is rotated by means of the spur 147 and the rack 150 to assume the normal operating position. The shaft 119 having been moved to the right causes the disengagement of the clutch members 123 and 124 and by causing an outward movement of the disc 123 causes the latter to disengage the interlocking member 135 from the groove 137 of the shaft 85 whereupon the latter is free to return to its normal upward position carrying with it the rack 99 and rotating the cam 71 by means of the latter to assume the position shown in dotted lines in Figure 1 whereupon the dogs 67 are again allowed to engage the ratchet surfaces 66 of the gear 65 thereby placing the entire operating mechanism in proper relation for further manipulation and extraction of cream.

It will be noted that during the operation of the apparatus as just described the cream is conducted upwardly by the tube 27 acting in conjunction with the tube 25 which latter tube assists in conducting the cream upwardly to the mold 109 as the tube 27 moves downwardly. The tubes 25 and 27 are substantially telescoped one within the other and the sliding bearing formed by the ring 28 and the packing 29 at the upper end of the tube 27 forms a non-leakable joint between the two tubes to prevent the cream from leaking into the space occupied by the threaded members 30 on the exterior of the tube 27. It will furthermore be observed that there is provided in the upper end of the mold 109 a vent 171 which permits the escape of air from the mold 109 in order that the latter may be entirely filled with cream. The vent 171 prevents the formation of an air pocket in the upper end of the mold 109 thereby allowing a perfectly molded cone, for example, of cream to be formed.

After the cream in the container 20 has been substantially entirely removed it is found that the tubes 27 and 25, the former in its lower-most position, are filled with cream. In order to restore the apparatus to a status such that it may begin operation upon a new and full container of cream it is necessary to return the tube 27 with its associated diaphragm 33 and blades 41 and 42 to its upper-most position as shown in Figure 1. In order to do this the driving gear 51 is reversed in its rotation by means of the crank and handle 166 now mounted upon the square shank 165 of the shaft 58 and operating upon the gear 51 through the medium of the bevel gear 57 mounted upon the shaft 58. Before such a reverse operation can take place it is necessary to disengage the dogs 67 from the interior ratchet surfaces 66 of the gear 65 and this is done by means of the shaft 85 which is moved downwardly by manually operating screw 172 or which is manually grasped and forced downwardly against the spring 89 thereby rotating the cam 71 through the medium of the rack 99 to assume the position shown in full lines in Figure 1. A reverse rotation of the gear 51 is now caused and the tube 27 is rotated in a like reversed direction thereby threading the tube 27 and its associated parts upwardly within the nut 32.

As such upward movement of the tube 27 takes place relatively to the tube 25 the upper curved portion of the butter-fly valve 167 cuts the cream ahead of it and by reason of its curvature it is caused to rotate counter-clockwise to assume the dotted line position in Figure 1, thereby substantially closing the upper end of the tube 27. Further upward movement of the tube 27 thereupon forces the cream in the tube 25 upwardly by reason of the closure of the upper end of the former tube as just described. The cream thus forced upwardly is molded in the form 109 which may be thereupon manually swung outwardly to discharge the cream in the manner hereinbefore described. The ejecting member 139 will operate as already described in conjunction with the trigger member 156 and by reason of the rotation of the shaft member 144 caused by the spur 147 no interference in its proper functioning is caused by the shaft 119 which remains inoperative during this reverse operation of the apparatus.

Upon the tube 27 having reached its upper-most position as shown in Figure 1 the apparatus is ready to be applied to a new container 20 filled with cream whereupon the operation hereinbefore in detail described is repeated. The butter-fly valve 167 will resume the position shown in full lines in Figure 1 since the portion thereof above the axis 168 has a greater area than the portion extending below the axis 168, thereby producing an unequal pressure on the two surfaces to swing the valve into the position already noted. The screw 172 is manually returned to its uppermost position.

In the foregoing description the means for manually placing the shaft 85 in the lowermost position during the operation in which the conducting tube and its associated parts is returned to the initial uppermost position has been shown as the screw 172. In the embodiment herein described, the screw 172 forms a convenient means for causing the above described operation.

While in the foregoing description this apparatus has been shown as operating upon ice cream, it is to be understood that this invention is not limited in its application to ice cream alone and that it may be applied to the handling mechanically or dispensing in a desired molded form, other materials having substantially similar plastic or other characteristics such as are possessed by ice cream.

The exterior housing and operating mechanism of this apparatus may be ornamentally designed and preferably nickel-plated for example to produce an apparatus highly pleasing to the eye and which it will be highly desirable to incorporate in a serving counter of the present universal type. It will be noted that this apparatus requires but small space laterally and that when a series of such apparatuses are incorporated in a serving counter there results a material saving in space and above all a highly efficient use of the space taken up thereby.

It will thus be seen that there is provided in this invention a practical and reliable apparatus for mechanically dispensing ice cream and which apparatus may be readily applied to containers of the usual commercial form without having recourse to a container of special design to be used in connection therewith. It is to be noted further that this invention avoids the use of hand devices in dispensing ice cream and performs this operation mechanically and automatically and thereby is conducive to a high and desirable degree of sanitation. It will futhermore be seen also that at no time during the continued operation of the apparatus is the container uncovered and that, therefore, no air of atmospheric temperature is admitted therein to cause a melting of the cream itself and also of the ice packing surrounding the container. Thus a very material saving in ice consumption is attained. It will be seen also that this invention provides an apparatus in which the several objects of this invention are achieved and in which the several advantages noted together with many others are effectually gained.

As various possible embodiments may be made in the above invention and as various changes might be made in the embodiment above set forth, it is to be understood that all matter herein set forth or shown in the accompanying drawings is to be interpreted as illustrative and not in a limiting sense.

I claim:

1. In apparatus of the class described, in combination, a container adapted to receive a plastic material, means substantially centrally positioned with respect to said container for conducting said material to the exterior of said container, and centripetally-acting means including a blade shaped to engage the upper and circumferential portion of said material within said container for moving said material to said centrally positioned conducting means.

2. In apparatus of the class described, in combination, a container adapted to receive a plastic material, means including a tube having a receiving opening adjacent the center of said container for conducting said material to the exterior of said container, and rotatable centripetal means for forcing said material in a radial direction to said conducting means.

3. In apparatus of the class described, in combination, a container for receiving a plastic material, means including a pair of telescoping tubes for conducting said material to the exterior of said container, rotatable centripetal means for forcing said material into said conducting means, and means for moving one of said tubes and said centripetal means into said container as the contents thereof is diminished.

4. In apparatus of the class described, in combination, a container adapted to receive a plastic material, means including a tube for conducting said material to the exterior of said container, a rotatable blade shaped spirally with respect to the plane perpendicular to the axis of rotation thereof for forcing said material into said conducting means, means for rotating said blade, and means for advancing said conducting means and said blade into said container as the contents thereof is diminished.

5. In apparatus of the class described, in combination, a container for receiving a plastic material, means for conducting said material to the exterior of said container, and rotatable means including a blade operating within said container extending from a substantially circumferential point in a substantially spiral direction to substantially a central point for moving said material inwardly towards said central point and to said conducting means.

6. In apparatus of the class described, in combination, a container for receiving a plastic material, means for conducting said material to the exterior of said container, and rotatable means including centripetally-acting blades and a diaphragm for forcing said material into said conducting means.

7. In apparatus of the class described, in combination, a container for receiving a plastic material, means for conducting said material to the exterior of said container, a rotatable diaphragm for restricting the path of said material to said conducting means, and centripetally-acting means mounted upon said diaphragm for forcing said material into said conducting means.

8. In apparatus of the class described, in combination, a container for receiving a plastic material, means for conducting said material to the exterior of said container, a rotatable diaphragm for restricting the path of said material to said conducting means, centripetally-acting means mounted upon said diaphragm for forcing said material into said conducting means, and means for advancing said diaphragm into said container as the contents thereof is diminished.

9. In apparatus of the class described, in combination, a container for receiving a plastic material, means including a tube for conducting said material to the exterior of said container, a diaphragm associated with said tube for restricting the path of said material to said conducting means, centripetally-acting means mounted upon said diaphragm for forcing said material into said conducting means, and means for rotating said conducting means.

10. In apparatus of the class described, in combination, a container for receiving a plastic material, means including a tube for conducting said material to the exterior of said container, a diaphragm associated with said tube for restricting the path of said material to said conducting means, centripetally-acting means mounted upon said diaphragm for forcing said material into said conducting means, means for rotating said conducting means, and means for advancing said conducting means and its associated parts into said container as the contents thereof is diminished.

11. In apparatus of the class described, in combination, a container for receiving a plastic material, means including a pair of telescoping tubes for conducting said material to the exterior of said container, one of said tubes being stationary and the other of said tubes being movable along its axis, means for restricting the path of said material to said second tube, centripetally-acting means for concentrating said material at the mouth of said second tube, and means for advancing said second tube into said container as the contents thereof is diminished.

12. In apparatus of the class described, in combination, a container for receiving a plastic material, means having a varying cross-section for molding said material into a predetermined form, means for conducting said material from said container to said molding means, and expansible means automatically conforming to said molding means for automatically ejecting said molded portion of said material from said molding means.

13. In apparatus of the class described, in combination, a container for receiving a plastic material, means having a varying cross-section for molding said material into a predetermined form, means for conducting said material from said container to said molding means, means for forcing said material through said conducting means and into said molding means, and automatically-acting resilient means adapted thereby to conform to said molding means for ejecting said molded portion of said material upon said molding means being completely filled with said material.

14. In apparatus of the class described, in combination, a container for receiving a plastic material, means having a varying cross-section for molding said material into a predetermined form, means for conducting said material from said container to said molding means, means for forcing said material through said conducting means and into said molding means, expansible gauging means adapted thereby to conform to the walls of said molding means and adapted to operate when said molding means is substantially completely filled, and automatically-acting means for ejecting said molded material from said molding means, said ejecting means being brought into operation by said gauging means.

15. In apparatus of the class described, in combination, a container for receiving a plastic material, conical means for molding said material into a predetermined form, means for conducting said material from said container into said molding means, expansible means automatically operated to eject the molded portion of said material from said molding means, motive means for operating said ejecting means, said ejecting means acting first as a gauge within said molding means to permit said motive means to operate said ejecting means only upon the molding means having been completely filled.

16. In apparatus of the class described, in combination, a container for receiving a plastic material, a single means for molding said material into a predetermined form, means for forcing said material from said container to said molding means, means substantially enveloping said molded material for ejecting the molded portion of said material from said molding means, motive means for operating said ejecting means and said means for forcing said material into said molding means, gauging means acting upon the complete filling of said molding means to disengage said motive means from said material forcing means and to bring into operation said ejecting means.

17. In apparatus of the class described in combination, a container for receiving a plastic material, means having a varying cross-section with respect to its longitudinal axis for molding said material into a predetermined form, means for conducting said material from said container to said molding means, means for swinging said molding means out of operative relation with said conducting means and exterior thereof, and means self adjustable to said molding means of variable cross-section acting automatically with said swinging means for ejecting the molded portion of said material from said molding means.

18. In apparatus of the class described, in combination, a container for receiving a plastic material, means for molding said material into a predetermined form, means for conducting said material from said container to said molding means, means for swinging said molding means out of operative relation with said conducting means, gauging means in said molding means for causing said swinging means to be brought into operation upon said molding means being completely filled, and ejecting means operated by said swinging means for ejecting the molded portion of said material from said molding means upon and during the operation of said swinging means.

19. In apparatus of the class described, in combination, a container for receiving a plastic material, means for molding said material into a predetermined form, means for conducting said material from said container to said molding means, means for swinging said molding means out of operative relation to said conducting means, gauging means for bringing into operation said swinging means upon said molding means being completely filled, said swinging means thereupon operating said gauging means to eject the molded portion from said molding means.

20. In apparatus of the class described, in combination, a container for receiving a plastic material, means for molding said material into a predetermined form, means for conducting said material from said container to said molding means, means for forcing said material through said conducting means and into said molding means, means for swinging said moulding means out of operative relation with said conducting means, gauging means in said molding means for bringing into operation said swinging means, said gauging means operating to halt the operation of said forcing means, and means for automatically ejecting the molded portion of said material from said molding means during the operation of said swinging means.

21. In apparatus of the class described, in combination, a container for receiving a plastic material, means for molding said material into a predetermined form, means for conducting said material from said container to said molding means, means for forcing said material through said conducting means and into said molding means, means for swinging said molding means out of operative relation with said conducting means, gauging means in said molding means for bringing into operation said swinging means, said gauging means operating to halt the operation of said forcing means, said gauging means operating during the operation of said swinging means to eject the molded portion from said molding means.

22. In apparatus of the class described, in combination, a container for receiving a plastic material, means for molding said material into a predetermined form, means including a pair of telescoping tubes for conducting said material from said container to said molding means, one of said tubes being stationary and the other of said tubes being movable along its axis, said molding means being positioned in operative relation to said stationary tube, means for forcing said material from said container through said telescoping tubes, means for swinging said molding means out of operative relation to said stationary tube, and means for automatically ejecting the molded portion from said molding means upon the operation of said swinging means.

23. In apparatus of the class described, in combination, a container for receiving a plastic material, means for molding said material into a predetermined form, means including a pair of telescoping tubes for conducting said material from said container to said molding means, one of said tubes being stationary and the other of said tubes being movable along its axis, said molding means being positioned in operative relation to said stationary tube, means for forcing said material from said container through said telescoping tubes, means for swinging said molding means out of operative relation to said stationary tube, gauging means for operating said swinging means upon the molding means being completely filled, said gauging means simultaneously causing said forcing means to be halted upon the operation of said swinging means.

24. In apparatus of the class described, in combination, a container for receiving a plastic material, means for molding said material into a predetermined form, means including a pair of telescoping tubes for conducting said material from said container to said molding means, one of said tubes being stationary and the other of said tubes being movable along its axis, said molding means being positioned in operative relation to said stationary tube, means for forcing said material from said container through said telescoping tubes, means for swinging said molding means out of operative relation to said stationary tube, gauging means for bringing into operation said swinging means upon the molding means being completely filled, said gauging means simultaneously causing said forcing means to be halted upon the operation of said swinging means, said gauging means acting also to eject the molded portion from said molding means during the operation of said swinging means.

25. In apparatus of the class described, in combination, a container for receiving a plastic material, means for molding said material into a predetermined form, means including a pair of telescoping tubes for conducting said material from said container to said molding means, one of said tubes being stationary and the other of said tubes being movable along its axis, said molding means being positioned in operative relation to said stationary tube, means for forcing said material from said container through said telescoping tubes, means for advancing said forcing means and said movable tube into said container as the contents thereof is diminished, means for swinging said molding means out of operative relation to said stationary tube, and means for automatically ejecting the molded portion from said molding means upon the operation of said swinging means.

26. In apparatus of the class described, in combination, a container for receiving a plastic material, means for molding said material into a predetermined form, means including a pair of telescoping tubes for conducting said material from said container to said molding means, one of said tubes being stationary and the other of said tubes being movable along its axis, said molding means being positioned in operative relation to said stationary tube, means for forcing said material from said container through said telescoping tubes, means for advancing said forcing means and said movable tube into said container as the contents thereof is diminished, means for swinging said molding means out of operative relation to said stationary tube, gauging means for bringing into operation said swinging means upon the molding means being completely filled, said gauging means simultaneously causing said forcing means to be halted upon the operation of said swinging means.

27. In apparatus of the class described, in combination, a container for receiving a plastic material, means for molding said material into a predetermined form, means including a pair of telescoping tubes for conducting said material from said container to said molding means, one of said tubes being stationary and the other of said tubes being movable along its axis, said molding means being positioned in operative relation to said stationary tube, means for forcing said material from said container through said telescoping tubes, means for advancing said forcing means and said movable tube into said container as the contents thereof is diminished, means for swinging said molding means out of operative relation to said stationary tube, gauging means for bringing into operation said swinging means upon the molding means being completely filled, said gauging means simultaneously causing said forcing means to be halted upon the operation of said swinging means, said gauging means acting also to eject the molded portion from said molding means during the operation of said swinging means.

28. In apparatus of the class described, in combination, a container for receiving a plastic material, means for conducting said material to the exterior of said container, means for removing successive layers of said material and forcing said removed portions through said conducting means, said removing and forcing means being adapted to be advanced from an initial position into said container as the contents thereof is diminished, and independently operative means for returning said removing and forcing means to its initial position.

29. In apparatus of the class described, in combination, a container for receiving a plastic material, means including a tube for conducting said material to the exterior of said container, means for removing successive layers of said material and forcing said removed portions through said conducting means, means for advancing said conducting tube and said removing and forcing means from an initial position into said container as the contents thereof is diminished, and independently operative means for returning said conducting means and said removing and forcing means to said initial position.

30. In apparatus of the class described, in combination, a container for receiving a plastic material, means including a pair of telescoping tubes for conducting said material to the exterior of said container, means for removing successive portions of said material, means for forcing said removed material through said conducting means, one of said telescoping tubes and said forcing means being adapted to be advanced from an initial position into said container as the contents thereof is diminished, and independently operative means for returning said movable tube and said forcing means to their initial position.

31. In apparatus of the class described, in combination, a container for receiving a plastic material, means for conducting said material to the exterior of said container, means for forcing said material through said conducting means, means for operating said forcing means, means for advancing said forcing means from an initial position into said container as the contents thereof are diminished, means for returning said forcing means to the initial position, and means for making said operating means for said forcing means inoperative during the operation of said returning means.

32. In apparatus of the class described, in combination, a container adapted to receive a plastic material, means including a tube for conducting said material to the exterior of said container, and rotatable centripetal means for forcing said material into said conducting means, said centripetal means including a centripetally-acting blade provided with a resilient extension thereon for sweeping the walls of said container during the rotation thereof.

33. In apparatus of the class described, in combination, a container for receiving a plastic material, means for conducting said material to the exterior of said container, and rotatable means including a centripetally-acting blade and a diaphragm for forcing said material into said conducting means, said diaphragm being provided with expandable circumferentially extending segments to insure the close fitting of said diaphragm to the walls of said container.

34. In apparatus of the class described, in combination, a container for receiving a plastic material, means for conducting said material to the exterior of said container, a rotatable diaphragm provided with pivotally mounted circumferentially extending segments for restricting the path of said material to said conducting means, and centripetally-acting means mounted upon said diaphragm for forcing said material into said conducting means.

35. In apparatus of the class described, in combination, a container for receiving a plastic material, means for conducting said material to the exterior of said container, a rotatable diaphragm provided with pivotally mounted circumferentially extending segments for restricting the path of said material to said conducting means, and a centripetally-acting blade mounted upon said diaphragm for forcing said material into said conducting means, said blade having a resilient extension for sweeping the walls of said container during the rotation of said blade and said diaphragm.

36. In apparatus of the class described, in combination, a container for receiving a plastic material, means including a pair of telescoping tubes for conducting said material to the exterior of said container, means for forcing said material through said conducting means, one of said telescoping tubes and said forcing means being adapted to be advanced from an initial position into said container as the contents thereof is diminished, means for returning said movable tube and said forcing means to their initial position, and automatically-acting means for closing the upper end of said movable tube upon the commencement of its return to initial position, whereby the contents of the other of said telescoping tubes is forced therethrough.

37. In apparatus of the class described, in combination, a container for receiving a plastic material, means including a pair of telescoping tubes for conducting said material to the exterior of said container, means for forcing said material through said conducting means, one of said telescoping tubes and said forcing means being adapted to be advanced from an initial position into said container as the contents thereof is diminished, means for returning said movable tube and said forcing means to their initial position, a pivotally mounted butterfly valve mounted in the upper end of said movable tube, and means associated with said butterfly valve to permit the operation thereof to close the upper end of said tube only during the return movement of said movable tube, whereby the contents of the first of said telescoping tubes is forced therethrough.

38. In apparatus of the class described, in combination, a pivotally mounted mold, means for forcing a plastic material into said mold, means mounted within said mold for ejecting the molded portion therefrom, and toggle-operated means for causing said ejecting means to eject said molded portion from said mold, the said toggle-acting means being operative upon the outward swinging of said pivotally mounted mold.

39. In apparatus of the class described, in combination, a container for receiving a plastic material, means for conducting said material to the exterior of said container, a rotatable diaphragm for restricting the path of said material to said conducting means and centripetally-acting means cooperating with said diaphragm for forcing said material into said conducting means.

In testimony whereof, I have signed my name to this specification this 29th day of October, 1919.

ROBERT F. SMALLWOOD.